Oct. 27, 1953

C. W. LINCOLN ET AL 2,657,287

DIRECTION SIGNAL SWITCH

Filed June 29, 1951

Inventors
Clovis W. Lincoln,
Philip B. Zeigler &
Ralph A. Malone

By Willits, Helwig & Baillio
Attorneys

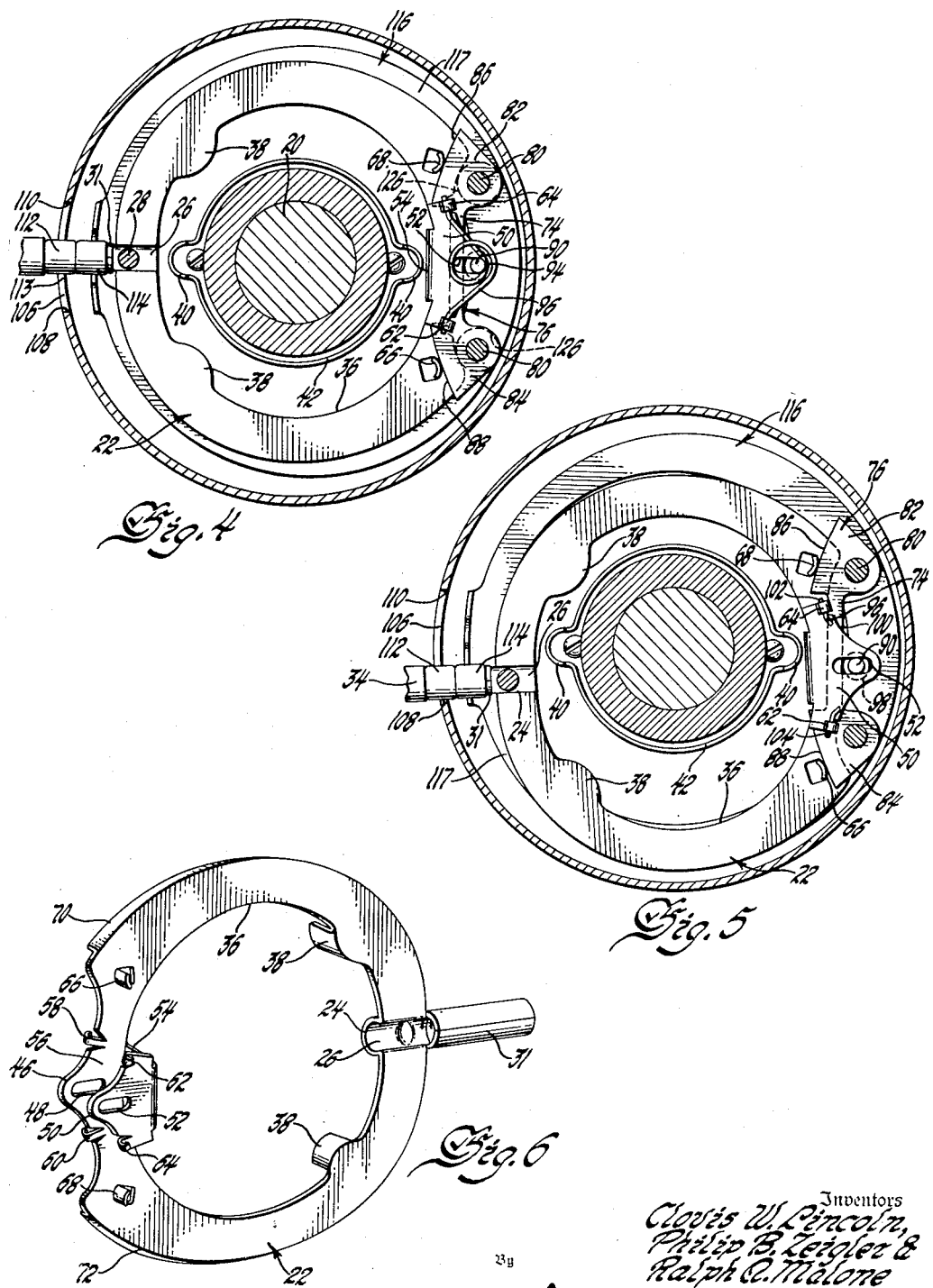

Patented Oct. 27, 1953

2,657,287

UNITED STATES PATENT OFFICE 2,657,287

DIRECTION SIGNAL SWITCH

Clovis W. Lincoln and Philip B. Zeigler, Saginaw, and Ralph A. Malone, Chesaning, Mich., assignors to General Motors Corporation, Detroit, Mich., a corporation of Delaware Application June 29, 1951, Serial No. 234,266

20 Claims. (Cl. 200—61.34)

This invention relates to direction signal systems for motor vehicles and more particularly to the switch operating mechanisms associated with such systems.

It is desirable to mount the control mechanism for direction signal systems on the steering column of a motor vehicle so that it will be convenient to the operator thereof. From a practical as well as an appearance standpoint it is also highly desirable to mount the operating parts for such systems interiorly of a casing and concentric with the steering column of the vehicle. Prior structures which have been so constructed and arranged were of a complicated design, comprised of a large number of individual parts and therefore expensive to manufacture as well as to repair.

One object of the present invention is to provide a novel and highly improved direction signal switch operating mechanism of the type described which is simple in construction, economic in manufacture, and highly efficient in operation.

Another object is to provide an operating mechanism for direction signal switches suitable for mounting within the steering column of a motor vehicle and having manual operation in the selection of turn signals and automatic operation in the cancellation thereof in response to actuation of the steering mechanism in the direction opposing the indicated turn.

A further object is to provide a switch operating mechanism of the character set forth which eliminates the common tendency of prior mechanisms to overtravel when automatically cancelled by rapid rotation of the steering mechanism.

A still further object is to provide a switch operating mechanism of the type described which may be held in an operated position during the normal cancelling action incident to rotating the steering wheel in the direction opposite the indicated turn without interfering with the operation of the steering mechanism.

Other and further objects will become apparent as the description of the invention progresses.

Of the drawings:

Fig. 4 is a plan view partly in section taken substantially along the line 4—4 of Fig. 2 showing the parts in neutral position.

Fig. 5 is a similar view showing the position of the parts in one of switch operated positions, and Fig. 6 is a perspective view of the switch operative ring associated with our switch operating mechanism.

Figure 1:
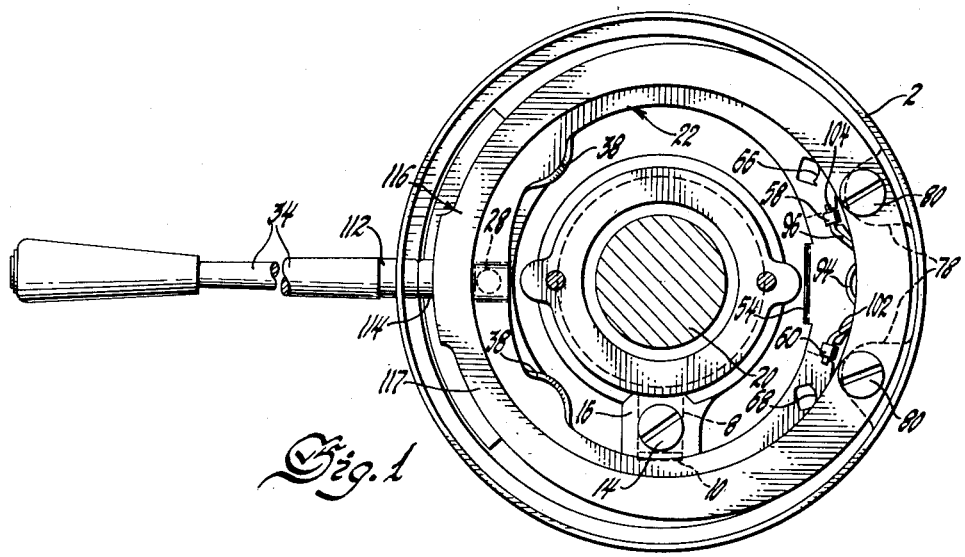
Fig. 1 is a plan view of the direction signal switch operating mechanism incorporating our invention taken substantially along the line 1—1 of Fig. 2.

Referring now to the drawings there is illustrated an annular housing 2 for the switch operating mechanism incorporating the invention having an offset reduced portion 4 provided with a centrally disposed aperture 5 adapted to receive the end of the steering column 6 of a motor vehicle. The housing 2 is attached to the steering column 6 in any suitable manner, as for example, by a substantially wedge-shaped key 8 which is slidably mounted in a slot 10, Fig. 1, in the wall of the housing 2 adjacent aperture 5. One wall 12, Fig. 2, of the slot 10 is inclined to form a surface cooperating with a wedge-shaped key 8 to force the latter into clamping engagement with the steering column 6. Clamping engagement is effected by a machine screw 14 which passes through a portion 16 of the housing 2 forming the end wall of slot 10. Adjustment of screw 14 causes key 8 to move axially in slot 10 along the inclined wall 12. An upward movement of the key member 8 forces it into clamping relation with the steering column, and a downward movement releases the key 8 from its clamping relation.

Figure 2:
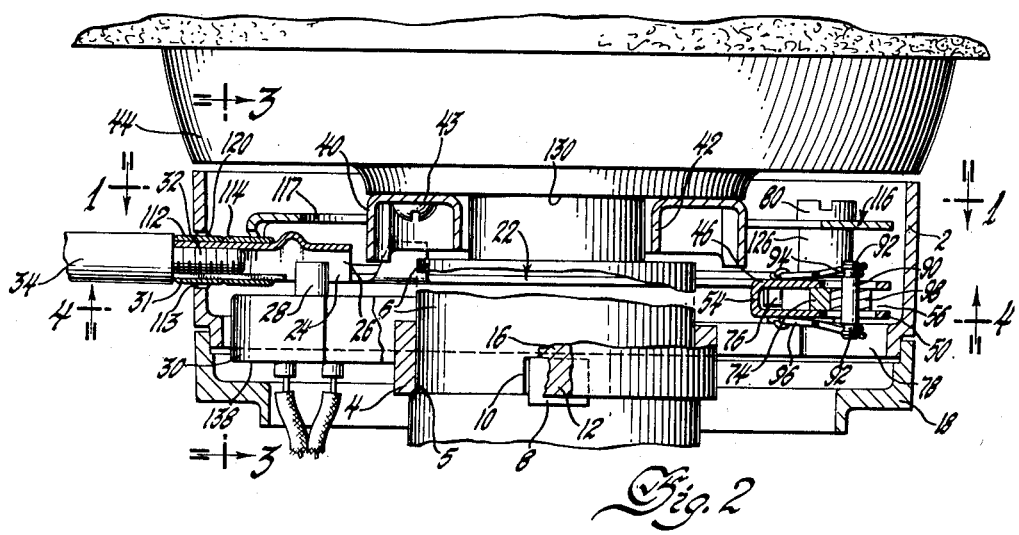
Fig. 2 is an enlarged elevational view partly in section illustrating our switch operating mechanism and the manner in which it is arranged on a vehicle steering column adjacent the steering wheel.
Figure 3:
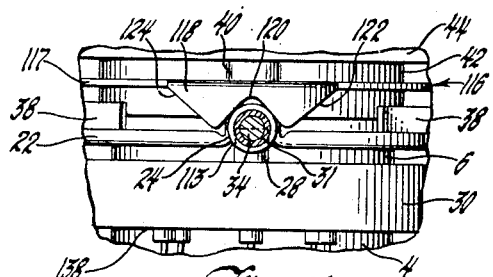
Fig. 3 is a fragmentary view, partly in section, taken substantially along line 3—3 of Fig. 2.

To provide a continuous streamlined appearance and conceal the switch mechanism wiring between the wall of the housing 2 and the gear selector lever housing, not shown, usually mounted on the steering column at a point immediately below the direction signal control, an annular collar 18 is provided as shown in Fig. 2.

Positioned within the housing 2 and arranged in substantially concentric relation with the vehicle steering shaft 20 is a relatively flat ring-shaped direction switch operating plate 22. Plate 22 may be constructed of sheet metal or of any other suitable material, and may be conveniently fashioned from a blank sheet in stamping and forming machines. As shown more particularly in Figs. 2 and 6, plate 22 is formed with an upstanding substantially U-shaped projection 24 at one end thereof forming a similarly shaped recess 26 therebeneath for receiving the upper end of an operating arm or projection 28 of the turn signal control switch 30, as will appear more fully hereinafter. In line with recess 26 and extending outwardly thereof is a tubular portion 31 having internal threads therein for receiving the externally threaded inner end 32 of an operating handle 34. Tubular portion 31 is formed in plate 22 by stamping or bending the flat portion to form a tube and then welding the seam, if it is so desired. Spaced an equal distance on either side of projection 28 and bent upwardly from the inner periphery 36 of plate 22 is a pair of substantially arcuate dogs 38. The dogs 38 are adapted to be engaged by dog ears or projections 40 mounted on a knock-out plate 42 connected to the steering wheel 44, for a purpose to be later described.

Plate 22 also has provided in line with the body proper thereof and at a position substantially diametrically opposed to projection 28, an outwardly extending substantially V-shaped projection 46 having an elongated slot 48 therein. A second substantially V-shaped projection 50 having an elongated slot 52 therein is disposed beneath and in vertical alignment with projection 46 and is connected to the latter by a web 54. Projection 50 and web 54 are formed in the body of plate 22 by stamping and then bent to the position shown in the drawings so as to form a yoke 56 for a purpose to be later described. A pair of spring retaining ears 58 and 60 are struck-up from plate 22 at spaced points thereon adjacent projection 46. A pair of similar spring retaining ears 62 and 64 are provided adjacent projection 50 and disposed in vertical alignment with ears 58 and 60, respectively.

Struck-down from the body of plate 22 and disposed at points substantially equidistant from either side of projection 46 is a pair of substantially arcuate bearing members 66 and 68. Stiffening flanges 70 and 72 also extend upwardly from the outer edge of plate 22 to increase the rigidity of the latter.

As shown more particularly in Figs. 2, 4 and 5, the yoke 56 of operating plate 22 in assembly, straddles the reduced portion 74 of a sector or guide plate 76 secured to a pair of supporting ears 78, integral with and extending inwardly of casing 2, in any suitable manner, such as by machine screws 80. Sector 76 comprises enlarged apertured guide portions 82 and 84 provided at the ends of reduced portion 74 through which the screws 80 extend into internally threaded openings provided in ears 78. Guide portions 82 and 84 have arcuate inner guide edges 86 and 88, respectively, thereon which are adapted to engage the arcuate bearing members 66 and 68, provided on operating plate 22. A pin 90 having an annular groove 92 provided near each end thereof for receiving the coil 94 of a two arm spring 96 extends through the aligned elongated slots 48 and 52 provided in yoke 56. A roller 98 is rotatably mounted on pin 90 and is confined between the upper and lower portions 46 and 50 of yoke 56. Roller 98 also is adapted to engage the outer edge 100 of the reduced portion 74 of sector 76 and is held in engagement therewith by the springs 96. In assembling the parts, the coil 94 of spring 96 is placed in the upper groove 92 of pin 90 and the ends of arms 102 and 104 of said spring are brought into locking engagement, respectively, with spring retaining ears 58 and 60. The lower spring 96 is similarly positioned on pin 90, the coil 94 thereof engaging the lower groove 92 and the ends of arms 102 and 104 being brought into locking engagement, respectively, with spring retaining ears 62 and 64. The pressure of springs 96 thus resiliently holds arcuate bearing members 66 and 68 in contact with the guide edges 86 and 88, respectively, at one side of sector 76 and the roller 98 in contact with the substantially straight edge 100 at the other side of said sector as shown in Fig. 4.

Operating plate 22 may be swung in either direction about its pivotal connection with sector plate 76 by handle 34 which extends through a transverse slot 106 provided in housing 2. The end walls 108 and 110 of slot 106 operate as stops for handle 34 and consequently of plate 22 to limit the travel thereof in either direction.

To facilitate operation of plate 22 a roller 112 is rotatably mounted on tubular portion 31 and in assembly engages the lower edge 113 of slot 106. A second roller 114 is also provided on tubular portion 31.

In order to retain plate 22 in the neutral position, shown in Fig. 4, or in either of its operated positions, a resilient retaining ring 116 is provided. Ring 116 consists of a flat annular body 117 constructed of sheet metal or of any other suitable material, and has a locking flange 118 at the side thereof adjacent handle 34 of the general shape of the letter W. The inner notch 120 of flange 118 engages roller 114 on tubular portion 31 to lock the latter and consequently plate 22 in neutral position, as shown in Fig. 4. When handle 34 is swung to the position shown in Fig. 5, the inclined edge 122 of flange 118 engages roller 113 of tubular portion 31 and holds it against the wall 108 of slot 106. When handle 34 is swung in the opposite direction from neutral the inclined edge 124 engages the said roller and holds it against the wall 110 of slot 106. The side of retaining ring 116 disposed substantially opposite flange 118 is secured to the ears 78 of housing 2 by the screws 80. As shown in Fig. 2 a spacer 126 surrounds each screw 80 and is disposed between the under side of ring 116 and the top of sector 76 whereby when the screws 80 are tightened the ring will be retained in the position shown in Fig. 2. When handle 34 is moved in either direction the roller 114 thereon cams spring 116 upwardly against the tension of the latter until it clears the lower end of flange 118 at which time the said spring moves downwardly causing inclined edge 122 or 124, as the case may be, to engage the said roller and thus resiliently urge and hold the handle and consequently plate 22 in adjusted position.

As shown more particularly in Figs. 1 and 2, knockout plate 42 comprises an annular body member 43 which is disposed in substantially concentric relation with the steering shaft 20 extending through steering column 6. Body member 43 is secured to the underside of the hub 130 of steering wheel 44 and is substantially U-shape in cross-section. The ears or projections 40 on knockout plate 42 are diametrically opposed, as shown in Fig. 1, and lie substantially midway between dogs 38 when the vehicle is moving in a straight path.

The plate 22 is returned to neutral position after actuation thereof to either of its signal indicating positions when the steering wheel is so turned as to straighten the vehicle after a turn to right or left has been completed. This is accomplished by engagement of the dog 38 on plate 22 which has been brought into the path of movement of the dog ears or projections 40 on knockout plate 42. Upon engagement of dog 38 by a projection 40 in this manner the plate 22 is swung in the opposite direction from which it was manually adjusted by handle 34 against the action of retaining ring 116 until it clears the lower end of the flange 118 on the latter when the ring moves downwardly thus urging the plate 22 toward neutral position and retaining the said plate in the position. Plate 22 is prevented from overtraveling its neutral position shown in Fig. 4. This is accomplished by the action of springs 96 and 116. When plate 22 moves toward neutral the pressure of springs 96 gradually increases thereby dampening the movement of said plate in that direction. It is also seen that when plate 22 is moved in either direction from neutral position the pressure of spring 116 also increases. Thus the combined action of springs 96 and 116 effectively prevent overtravel of plate 22 beyond its neutral position. When plate 22 is in neutral position it will be observed that pin 90 is at the outermost end of the elongated slots 48 and 52 provided in yoke 56. When plate 22 is swung in either direction from its neutral position about its pivotal connection with guide plate 76, as for example to the position shown in Fig. 5, it is moved longitudinally by springs 96 causing pin 90 to occupy a position intermediate the ends of slots 48 and 52. It therefore is seen that should steering wheel 44 continue to turn in the direction of the indicated turn, inasmuch as handle 34 is prevented from turning further by its engagement with the end wall of slot 106, the projections or dog ears 40 on knockout plate 42 upon engagement with the dog 38 in the path thereof will actuate plate 22 longitudinally against the action of springs 96. When the projection 40 so engaging dog 38 has cleared the latter springs 96 will return plate 22 to the position shown in Fig. 5. It is also seen that by holding lever 34 against wall 110 of slot 106 the projections or dog ears 40 will also urge plate 22 longitudinally against springs 96 when steering wheel 44 is turned in the opposite direction to straighten the car after completing the turn until they clear the said dog ears, when the springs 96 will again return the parts to the position shown in Fig. 5. When lever 34 is swung to the other extreme position plate 22 also moves longitudinally thereby causing pin 90 to lie intermediate the ends of slots 48 and 52. Consequently when a projection 40 engages the dog 38 lying in the path thereof while the steering wheel is turning in the direction of the indicated turn the plate 22 will be moved bodily against the action of springs 96 since the said plate cannot swing further about its pivotal connection with guide plate 76 due to the engagement of handle 34 with the wall of slot 106. This bodily movement of plate 22 continues until a projection 40 clears the dog 38 at which time the springs 96 return the parts to the positions occupied before the plate was so moved. The handle 34 may also be held in adjusted position during movement of steering wheel 44 in the opposite direction since upon engagement of a dog 38 by a projection 40 on knockout plate 42, the plate 22 will again be moved longitudinally as previously described until the said projection clears the dog, when the springs 96 will again restore the parts to the position occupied before the plate was so moved.

The direction signal may thus be held in operation as long as desired even though the steering wheel has been so turned as to straighten the car. The structure just described also insures proper operation of the steering mechanism in the event that an obstruction such as a bolt or nut should become lodged between plate 22 and knockout plate 42. Under such conditions it is clear that plate 22 will be moved longitudinally as just described thereby preventing any binding action between plate 22 and steering wheel 44. Proper operation of the steering mechanism is therefore assured by this resilient safety mounting for plate 22.

Switch 30 is of a type commonly used in direction signal indicating systems and is so constructed as to control the energization and de-energization of the various circuits of said system. Switch 30 generally comprises a bridging member (not shown) operatively connected to the operating arm or projection 28. The bridging member is mounted in the casing 138 of switch 30 and is adapted for operation by plate 22, through the connection of the latter with arm 28 across a plurality of contacts to control the direction signal circuits. The specific construction of switch 30 and the circuits controlled thereby are not illustrated or described herein since any suitable switch or circuits may be employed. For a complete disclosure of such switch and signal system reference may be had to the copending application of Clovis W. Lincoln et al., Serial No. 132,180, filed December 9, 1949, for Direction Signal Switch.

The switch 30 is so constructed that when plate 22 is in neutral position as shown in Fig. 4, the circuits to all of the direction signals are open. Upon movement of the plate 22 to the position shown in Fig. 5 the switch 30 closes the circuits to the signals designating a turn, as for example a left turn, and when said plate is moved to the other extreme position the said switch closes the circuits to the signals designating, for example, a right turn. When the switch 30 is so operated only the circuits to the selected signals are closed, all others being simultaneously opened.

From the foregoing description it is seen that an improved and highly reliable signal switch operating mechanism has been devised. The device consists of but a few simple parts which, for the most part, may be constructed from sheet metal in stamping and forming machines and therefore manufactured at a low cost.

While but a single embodiment has been shown and described, it is apparent that certain changes and modifications may be made therein without departing from the invention. It is to be understood, therefore, that it is not intended to limit the invention to the single embodiment disclosed but only by the scope of the claims which follow.

What is claimed is:

1. In a device of the class described, the combination of a switch movable from an open neutral position to circuit closing positions at opposite sides of said neutral position, an operating member for said switch, a fixed support, and means for pivotally mounting said member on said support, said last mentioned means comprising, a yoke integral with one end of said member having aligned elongated slots therein straddling said support, means mounted in said slots engaging one side of said support, and means provided on said member engaging the other side of said support.

2. In a device of the class described, the combination of a switch movable from an open neutral position to circuit closing positions on either side of said neutral position, an operating member for said switch, a supporting guide member, and means for pivotally mounting said operating member on said supporting member, comprising, means on said operating member bent to form a yoke, said yoke straddling said supporting member and having aligned elongated slots therein, means mounted in said slots adapted to engage one side of said supporting member, and bearing means on said operating member adapted to engage the other side of said supporting member.

3. In a device of the class described, the combination of a switch movable from an open neutral position to circuit closing positions on either side of said neutral position, an operating member for said switch, a supporting guide member, and means for pivotally mounting said operating member on said supporting member, comprising, means on said operating member bent to form a yoke, said yoke straddling said supporting member and having aligned elongated slots therein, means mounted in said slots adapted to engage one side of said supporting member, bearing means on said operating member adapted to engage the other side of said supporting member, and resilient means operatively connecting said operating member to said means mounted in said slots for resiliently urging the latter and said bearing means into engagement with said supporting member.

4. In a device of the class described, the combination of a switch movable from an open neutral position to circuit closing positions on either side of said neutral position, an operating member for said switch, a supporting guide member, and means for pivotally mounting said operating member on said supporting member, comprising, means on said operating member bent to form a yoke, said yoke straddling said supporting member and having aligned elongated slots therein, means mounted in said slots adapted to engage one side of said supporting member, and spaced bearing projections struckup from said operating member adapted to engage the other side of said supporting member.

5. In a device of the class described, the combination of a switch movable from an open neutral position to circuit closing positions at either side of said neutral position, an operating member for actuating said switch to its different positions of adjustment, a supporting guide member, and means for pivotally mounting said operating member on said supporting member, comprising, a yoke integral with one end of said operating member and including spaced legs and a web connecting said legs, said legs having aligned elongated slots therein, said yoke straddling said supporting member, a pin extending through said slots, a roller mounted on said pin adapted to engage one side of said supporting member, spaced means on said member engaging the other side of said supporting member, spaced retaining ears struck-up from at least one of said legs of said yoke, and spring means having a coil engaging said pin and oppositely extending arms engaging said retaining ears, whereby said roller and spaced means are resiliently urged into engagement with the said supporting member.

6. In a device of the class described, the combination of a switch movable from an open neutral position to circuit closing positions at either side of said neutral position, an operating member for actuating said switch to its different positions of adjustment, a supporting guide member, and means for pivotally mounting said operating member on said supporting member, comprising, a yoke integral with one end of said operating member and including spaced legs and a web connecting said legs, said legs having aligned elongated slots therein, said yoke straddling said supporting member, a pin extending through said slots, a roller mounted on said pin adapted to engage one side of said supporting member, spaced means on said member engaging the other side of said supporting member, spaced retaining ears struck-up at opposite sides of each of said legs of said yoke, a spring having a coil engaging one end of said pin and oppositely extending arms engaging the said retaining ears adjacent one of said legs, and a second spring having a coil engaging the other end of said pin and oppositely extending arms engaging the said retaining ears adjacent the other of said legs.

7. In a device of the class described, the combination of a switch movable to different positions, an operating member for said switch, manual means for actuating said operating member in either direction from a neutral position, spaced dogs bent outwardly of said operating member, steering means, knockout means operable with said steering means adapted to engage one of said dogs when said operating member has been moved to one position to thereby return said member to neutral position and to engage the other of said dogs when said member has been actuated in the other direction from neutral to again return said member to neutral position.

8. In a device of the class described, the combination of a switch movable to different positions of adjustment, a steering column, a steering wheel rotatably supported at one end of said column, an annular operating plate for said switch surrounding said column, a supporting member, means for pivotally connecting one end of said operating plate to said supporting member, an operating handle attached to the opposite end of said plate, a pair of substantially arcuate dogs bent up from said plate at positions substantially equidistant from said handle, and a knockout member mounted for movement with said steering wheel adapted to engage either of said dogs to return said plate and switch to neutral position after operation thereof to switch closing position.

9. In a device of the class described, the combination of a switch movable from an open neutral position to circuit closing positions at either side of said neutral position, a steering column, a steering wheel rotatably supported at one end of said column, an annular operating plate for said switch surrounding said column, a supporting guide member, means for pivotally mounting one end of said operating plate on said supporting member comprising, a yoke integral with said operating plate straddling said supporting member, said yoke having aligned elongated slots therein, means mounted in said slots adapted to engage one side of said supporting member, struck-up bearing means on said plate adapted to engage the other side of said supporting member, resilient means for urging said bearing means and said means mounted in said slots into engagement with said supporting member, spaced bent up dogs on said operating plate, and a knockout member mounted for movement with said steering wheel adapted to engage either of said dogs to return said plate to neutral position after operation thereof to switch closing position.

10. In a device of the class described, the combination of a switch movable from an open neutral position to circuit closing positions at either side of said neutral position, a steering column, a steering wheel rotatably supported at one end of said column, an annular operating plate for said switch surrounding said column, a supporting guide member, means for pivotally mounting one end of said operating plate on said supporting member comprising, a yoke integral with said operating plate straddling said supporting member, said yoke having aligned elongated slots therein, means mounted in said slots adapted to engage one side of said supporting member, struck-up bearing means on said plate adapted to engage the other side of said supporting member, and resilient means for urging said bearing means and said means mounted in said slots into engagement with said supporting member, spaced bent up dogs on said operating plate, and a knockout member mounted for movement with said steering wheel adapted to engage either of said dogs to return said plate to neutral position after operation thereof to switch closing position, a handle for swinging said plate from neutral position in either direction to close said switch, stop means for limiting the movement of said plate in either direction, resilient means for retaining said plate in any of its adjusted positions, and casing means enclosing said switch and operating plate.

11. A switch operating member, comprising, a relatively flat body portion, a substantially U-shaped projection formed on said body portion at one end thereof, an integral cylindrical handle receiving portion formed in alignment with said projection, and means formed on said plate for pivotally attaching the latter to a support.

12. A switch operating member, comprising, a relatively flat body portion, means integral with one end of said body portion bent to form a yoke, a projection formed near the other end of said support, and means integral with said body portion bent to form a handle receiving element.

13. A switch operating member, comprising, a relatively flat body member, means integral with said body portion bent to form a handle receiving element, means on said body portion for attaching the latter to a support, one or more dogs integral with said body portion and bent upwardly therefrom, and stiffening flanges integral with said body portion.

14. A switch operating member, comprising, a relatively flat body portion, switch engaging means formed in said body portion at one end thereof, means integral with said body portion bent to form a substantially cylindrical handle receiving element, means formed on said body portion for pivotally mounting the latter on a support, spaced substantially arcuate bearing elements struck-up from said body portion.

15. A switch operating member, comprising a relatively flat annular body portion, switch engaging means formed in said body portion at one end thereof, means integral with said body portion bent to form a substantially cylindrical handle receiving element, means formed on said body portion for pivotally mounting the latter on a support, spaced substantially arcuate bearing elements struck-up from said body portion, and a pair of spaced substantially arcuate dogs bent outwardly of said body portion.

16. A switch operating member, comprising, a relatively flat annular body portion, switch engaging means formed in said body portion at one end thereof, means integral with said body portion bent to form a substantially cylindrical handle receiving element, means formed on said body portion for pivotally mounting the latter on a support, spaced substantially arcuate bearing elements struckup from said body portion, a pair of spaced substantially arcuate dogs bent outwardly of said body portion, and stiffening flanges integral with said body portion.

17. A switch operating member, comprising, a relatively flat annular body portion, depressed switch engaging means formed in said body portion at one end thereof, means integral with said body portion in alignment with said last mentioned means and bent to form a cylindrical handle receiving element, means integral with the other end of said body portion bent to form an attaching yoke for said member, spaced pairs of spring attaching ears struckup from said body portion adjacent the legs of said yoke, spaced substantially arcuate bearing elements struckup from said body portion and disposed substantially equidistant from either side of said yoke.

18. A switch operating member, comprising, a relatively flat annular body portion, depressed switch engaging means formed in said body portion at one end thereof, means integral with said body portion in alignment with said last mentioned means and bent to form a cylindrical handle receiving element, means integral with the other end of said body portion bent to form an attaching yoke for said member, spaced pairs of spring attaching ears struckup from said body portion adjacent the legs of said yoke, spaced substantially arcuate bearing elements struckup from said body portion and disposed substantially equidistant from either side of said yoke, a pair of spaced substantially arcuate dogs bent up from the inner periphery of said body portion, and stiffening flanges bent up from the outer periphery of said body portion.

19. In a motor vehicle, a steering column, a housing having a slot therein mounted on said steering column, a switch mounted in said housing, a sector plate having a plurality of edges, an operating plate for said switch, a plurality of upturned projections integral with said plate, a roller shiftably attached to said plate, said upturned projections and said roller engaging opposite edges of said sector plate to guide said operating plate in its switch operating movements, and a lever attached to said operating plate and extending through the said slot in said housing for manual adjustment of said operating plate.

20. A direction signal switch mechanism, comprising, a housing having a slot therein, a sector plate secured to said housing, said sector plate having guiding edges at opposite sides thereof, an operating plate for said switch shiftably mounted on said sector plate, a plurality of struck-up projections on said operating plate engaging the said guiding edge on one side of said sector plate, a roller shiftably attached to said operating plate and adapted to engage the guiding edge on the other side of said sector plate, a switch mounted in said housing and actuated by said operating plate, and an operating lever attached to said operating plate extending outwardly through said slot in said housing for adjusting said operating plate along said guiding edges to effect opening and closing of said switch.

CLOVIS W. LINCOLN.
PHILIP B. ZEIGLER.
RALPH A. MALONE.

References Cited in the file of this patent

UNITED STATES PATENTS

| Number | Name | Date |
| --- | --- | --- |
| 1,947,681 | Stow | Feb. 20, 1934 |